United States Patent
Kakande et al.

(10) Patent No.: US 9,369,213 B1
(45) Date of Patent: Jun. 14, 2016

(54) DEMULTIPLEXING PROCESSING FOR A RECEIVER

(71) Applicants: Alcatel-Lucent USA Inc., Murray Hill, NJ (US); Alcatel-Lucent, Boulogne Billancourt (FR)

(72) Inventors: Joseph K. Kakande, Jersey City, NJ (US); Fabian N. Hauske, Woerthsee (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/642,187

(22) Filed: Mar. 9, 2015

(51) Int. Cl.
| | |
|---|---|
| *H03H 7/30* | (2006.01) |
| *H04B 10/61* | (2013.01) |
| *H04L 25/03* | (2006.01) |
| *H04L 27/01* | (2006.01) |

(52) U.S. Cl.
CPC ........ *H04B 10/6166* (2013.01); *H04B 10/6162* (2013.01); *H04L 25/03197* (2013.01); *H04L 25/03331* (2013.01); *H04L 27/01* (2013.01); *H04L 2025/03426* (2013.01)

(58) Field of Classification Search
CPC ........... H04B 10/6166; H04B 10/6162; H04B 10/611; H04B 10/2513; H04B 10/532; H04B 10/614; H04B 10/615; H04L 25/03197; H04L 25/03331; H04L 27/01; H04L 2025/03426
USPC ......... 375/229–230, 232, 235, 316, 346–350; 398/65, 152, 154, 159, 202, 204–205, 398/208
See application file for complete search history.

(56) References Cited

U.S. PATENT DOCUMENTS

| | | |
|---|---|---|
| 6,683,855 B1 | 1/2004 | Bordogna et al. |
| 6,904,087 B2 | 6/2005 | Li |
| 7,061,977 B2 | 6/2006 | Martin et al. |
| 7,212,741 B2 | 5/2007 | Myong et al. |
| 7,266,310 B1 | 9/2007 | Savory et al. |
| 7,424,651 B2 | 9/2008 | Domagala et al. |
| 7,574,146 B2 | 8/2009 | Chiang et al. |
| 7,636,525 B1 | 12/2009 | Bontu et al. |

(Continued)

OTHER PUBLICATIONS

Ip, Ezra M., et al., "Fiber Impairment Compensation Using Coherent Detection and Digital Signal Processing," Journal of Lightwave Technology, IEEE, vol. 28, No. 4., 2010, pp. 502-519.

(Continued)

*Primary Examiner* — Khanh C Tran
(74) *Attorney, Agent, or Firm* — Mendelsohn Dunleavy, P.C.; Yuri Gruzdkov

(57) ABSTRACT

We disclose demultiplexing processing for an adaptive MIMO equalizer of a receiver of multiplexed communication signals implemented in a manner that significantly reduces the occurrence of singularities at the equalizer output without a significant concomitant increase in the required computational power. The receiver includes an equalizer controller that operates to dynamically track the degree of correlation of one or more pairs of equalized signals outputted by the MIMO equalizer and to use the tracking results to configure the MIMO equalizer in a manner that substantially prevents any two outputs of the MIMO equalizer from converging to the same state. In an example embodiment, the degree of correlation can be determined in a computationally efficient manner by identifying and comparing quadrants in which complex values produced at the different outputs of the MIMO equalizer are located over a plurality of time slots.

20 Claims, 4 Drawing Sheets

(56) References Cited

U.S. PATENT DOCUMENTS

| | | | |
|---|---|---|---|
| 7,734,191 B1 | 6/2010 | Welch et al. | |
| 7,747,177 B2 | 6/2010 | Chen et al. | |
| 7,809,284 B2 | 10/2010 | Kaneda et al. | |
| 8,260,154 B2 | 9/2012 | Chang et al. | |
| 8,275,224 B2 | 9/2012 | Doerr | |
| 2007/0058503 A1* | 3/2007 | Watabe | G11B 7/24038 369/44.39 |
| 2008/0152361 A1 | 6/2008 | Chen et al. | |
| 2010/0014873 A1* | 1/2010 | Bulow | H04B 10/6161 398/159 |
| 2010/0329671 A1 | 12/2010 | Essiambre et al. | |
| 2011/0033184 A1* | 2/2011 | Zhang | H04J 14/002 398/65 |
| 2011/0243561 A1* | 10/2011 | Li | H04B 10/611 398/65 |
| 2011/0255858 A1 | 10/2011 | Xie et al. | |
| 2012/0057863 A1 | 3/2012 | Winzer et al. | |
| 2012/0224861 A1 | 9/2012 | Winzer et al. | |
| 2012/0224863 A1 | 9/2012 | Winzer et al. | |
| 2013/0070785 A1 | 3/2013 | Liu et al. | |
| 2013/0230312 A1 | 9/2013 | Randel et al. | |
| 2013/0236195 A1* | 9/2013 | Ryf | H04B 10/615 398/208 |
| 2013/0272704 A1* | 10/2013 | Zamani | H04B 10/532 398/65 |
| 2014/0186024 A1 | 7/2014 | Randel et al. | |
| 2014/0270803 A1* | 9/2014 | Olsson | H04B 10/532 398/152 |
| 2014/0294387 A1* | 10/2014 | Hauske | H04B 10/2513 398/65 |
| 2014/0369685 A1* | 12/2014 | Calabro | H04B 10/614 398/65 |

OTHER PUBLICATIONS

Pincemin, Erwan, et al., "Novel Blind Equalizer for Coherent DP-BPSK Transmission Systems: Theory and Experiment," IEEE Photonics Technology Letters, vol. 25, No. 18, 2013, pp. 1835-1838.

Kaneda, Noriaki, "Optical Receiver Having an Equalization Filter with an Integrated Signal Re-Sampler," U.S. Appl. No. 14/308,756, filed Jun. 19, 2014.

* cited by examiner

100

300

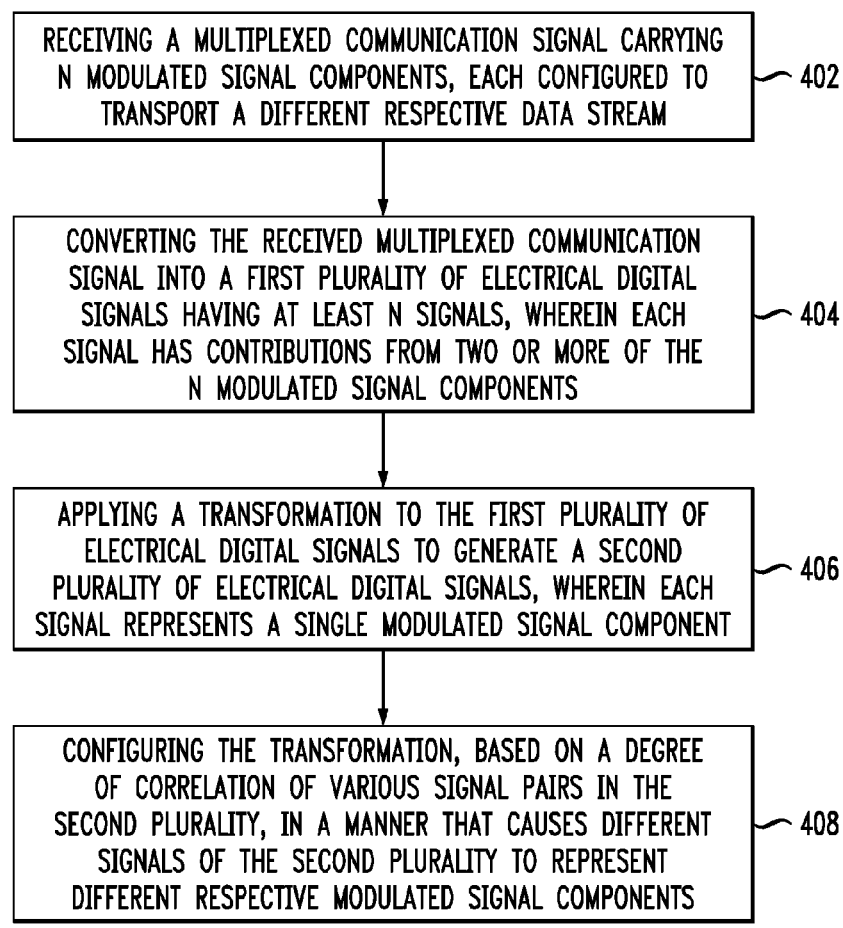

DEMULTIPLEXING PROCESSING FOR A RECEIVER

BACKGROUND

1. Field

The present disclosure relates to communication equipment and, more specifically but not exclusively, to digital signal processing at a receiver.

2. Description of the Related Art

This section introduces aspects that may help facilitate a better understanding of the disclosure. Accordingly, the statements of this section are to be read in this light and are not to be understood as admissions about what is in the prior art or what is not in the prior art.

Polarization multiplexing enables optical communication systems to increase the effective bit rate and spectral efficiency. However, due to various transmission impairments, such as birefringence, polarization-mode dispersion (PMD), and polarization dependent loss (PDL), polarization tracking at the receiver may be relatively difficult to implement. For example, polarization-demultiplexing processing performed in the electrical digital domain at the optical receiver may be computationally intensive and/or power consuming.

SUMMARY OF SOME SPECIFIC EMBODIMENTS

Various embodiments of demultiplexing processing for an adaptive multiple-input/multiple-output (MIMO) equalizer of a receiver of multiplexed communication signals may be implemented in a manner that significantly reduces the occurrence of singularities at the equalizer output without a significant concomitant increase in the required computational power. In some embodiments, the receiver includes an equalizer controller that operates to dynamically track the degree of correlation of one or more pairs of equalized signals outputted by the MIMO equalizer and to use the tracking results to configure the MIMO equalizer in a manner that substantially prevents any two outputs of the MIMO equalizer from converging to the same state. In an example embodiment, the degree of correlation can be determined in a computationally efficient manner by identifying and comparing quadrants in which complex values produced at the different outputs of the MIMO equalizer are located over a plurality of time slots.

Some embodiments may be used for demultiplexing polarization-division-multiplexed optical signals and/or spatially multiplexed optical signals transmitted over a multimode or multi-core optical fiber. Depending on the operative constellation(s), a constant-modulus algorithm (CMA) or a multi-modulus algorithm (MMA) may be employed by the equalizer controller to adaptively determine filter tap coefficients for the MIMO equalizer.

According to one embodiment, provided is an apparatus comprising: an optical detector that includes a polarization splitter configured to split an optical polarization-division-multiplexed signal into two light beams and an optical-to-electrical converter configured to generate a plurality of electrical signals by optically detecting different combinations of light of the two light beams with light of an optical local oscillator; and a digital signal processor configured to receive the plurality of electrical signals from the optical detector and generate therefrom an estimate of first data carried by a first polarization of the optical PDM signal and second data carried by a different second polarization of the optical PDM signal. The digital signal processor comprises: an equalizer configured to apply polarization demultiplexing to a first pair of complex-valued electrical digital signals generated by the digital signal processor from the plurality of electrical digital signals to generate a second pair of complex-valued electrical digital signals, wherein a first complex-valued electrical digital signal of the second pair is encoded with the first data but not the second data, and a second complex-valued electrical digital signal of the second pair is encoded with the second data but not the first data; and an equalizer controller operatively connected to adaptively configure the equalizer based on a degree of correlation of the first complex-valued electrical digital signal and the second complex-valued electrical digital signal determined by identifying and comparing quadrants in which complex values carried by the first and second complex-valued electrical digital signals are located over a plurality of time slots.

According to another embodiment, provided is a machine-implemented signal-processing method comprising the steps of: receiving a multiplexed communication signal carrying N modulated signal components, each configured to carry a different respective data stream, where N is an integer greater than two; converting the multiplexed communication signal into a first plurality of electrical digital signals, wherein each electrical digital signal of the first plurality has contributions from two or more of the N modulated signal components; applying a transformation to the first plurality of electrical digital signals to generate a second plurality of electrical digital signals, wherein each electrical digital signal of the second plurality represents a respective single modulated signal component of the N modulated signal components; and configuring the transformation, based on degrees of correlation of pairs of the electrical digital signals in the second plurality, in a manner that causes different signals of the second plurality to represent different respective modulated signal components of the N modulated signal components.

According to yet another embodiment, provided is a machine-implemented signal-processing method comprising the steps of: receiving a polarization-division-multiplexed optical signal having a first modulated polarization component and a second modulated polarization component, each configured to carry a different respective data stream; converting the polarization-division-multiplexed optical signal into a first pair of electrical digital signals, wherein each electrical digital signal of the first pair has contributions from both of the first and second modulated polarization components; applying a transformation to the first pair of electrical digital signals to generate a second pair of electrical digital signals, wherein each electrical digital signal of the second pair represents a different single one of the first and second modulated polarization components; and configuring the transformation based on a degree of correlation of the second pair of the electrical digital signals determined by identifying and comparing quadrants in which complex values carried by the electrical digital signals of the second pair are located over a plurality of time slots.

According to yet another embodiment, provided is an apparatus comprising: a digital signal processor that comprises an equalizer configured to equalize first complex electrical digital signals of a first sequence and to equalize different second complex electrical digital signals of a second sequence. The digital signal processor is configured to make quadrant measurements of individual ones of the complex digital signals of the first sequence and to make quadrant measurements of individual ones of the complex digital signals of the second sequence. The digital signal processor is further configured to evaluate a correlation between the quadrant measurements of the individual ones of the complex digital signals of the first sequence with the quadrant measurements of the individual ones of the complex digital signals of the second sequence.

BRIEF DESCRIPTION OF THE DRAWINGS

Other aspects, features, and benefits of various disclosed embodiments will become more fully apparent, by way of example, from the following detailed description and the accompanying drawings, in which:

FIG. 4 shows a flowchart of a signal-processing method according to an embodiment.

DETAILED DESCRIPTION

Figure 1:
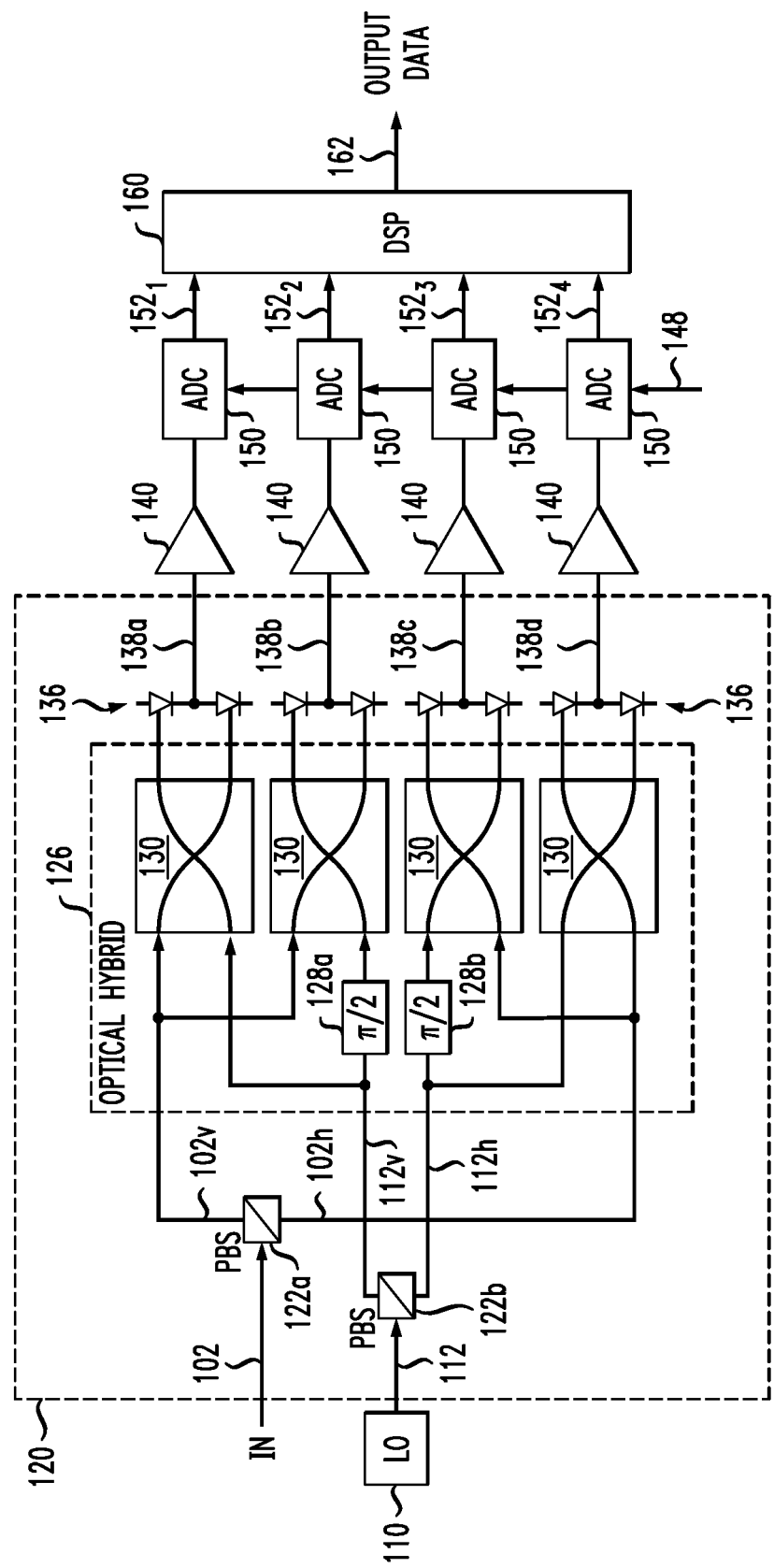
FIG. 1 shows a block diagram of an optical receiver according to an embodiment.

FIG. 1 shows a block diagram of a coherent optical receiver 100 according to an embodiment of the disclosure. Receiver 100 is configured to receive a polarization-multiplexed modulated optical signal 102, e.g., from a remote transmitter, via an external optical communication link (e.g., a fiber-optic link, not explicitly shown in FIG. 1). Optical signal 102 is applied to an optical-to-electrical (O/E) converter 120 that converts that optical signal into four electrical signals 138a-138d. Each of signals 138a-138d may optionally be amplified in a corresponding amplifier 140 coupled to a corresponding analog-to-digital converter (ADC) 150. Each ADC 150 samples the output of a corresponding amplifier 140 at an appropriate sampling frequency and sampling phase(s) set by a control signal 148 to produce a corresponding one of four digital signals $152_1$-$152_4$. Digital signals $152_1$-$152_4$ are applied to a digital signal processor (DSP) 160 that processes them, e.g., as described in more detail below in reference to FIGS. 2-4, to recover the data streams originally encoded onto the two polarization components of optical signal 102 at the remote optical transmitter. DSP 160 outputs the recovered data via an electrical output data signal 162.

In an example embodiment, receiver 100 may also include a set of electrical low-pass filters (not explicitly shown in FIG. 1), each inserted between O/E converter 120 and the respective one of ADCs 150. The use of these filters may help to reduce noise and prevent aliasing.

Control signal 148 is typically used to configure ADCs 150 to sample their respective input signals at a sampling rate that causes each ADC to generate two signal samples per symbol period T. In some embodiments, control signal 148 may have a frequency that is two times higher than the nominal symbol rate of optical signal 102, but otherwise is not synchronized with the internal clock of the optical signal. In some other embodiments, control signal 148 may be generated using a clock-recovery module of DSP 160 (not explicitly shown in FIG. 1).

O/E converter 120 implements a polarization-diversity homodyne- or intradyne-detection scheme using an optical local-oscillator (LO) signal 112 generated by a laser source 110. In an example embodiment, O/E converter 120 may be an integrated planar waveguide circuit. Polarization beam splitters (PBSs) 122a and 122b in O/E converter 120 operate to decompose signals 102 and 112, respectively, into two respective orthogonally polarized components, illustratively vertically polarized components 102v and 112v and horizontally polarized components 102h and 112h. These polarization components are then directed to an optical hybrid 126.

In optical hybrid 126, each of polarization components 102v, 112v, 102h, and 112h is split into two (attenuated) copies, e.g., using a conventional 3-dB power splitter (not explicitly shown in FIG. 1). A relative phase shift of about 90 degrees ($\pi/2$ radian) is then applied to one copy of component 112v and one copy of component 112h using phase shifters 128a and 128b, respectively. The various copies of signals 102v, 112v, 102h, and 112h are optically mixed with each other as shown in FIG. 1 using four optical signal mixers 130, and the mixed signals produced by the mixers are detected by eight photo-detectors (e.g., photodiodes) 136. Photo-detectors 136 may be arranged in pairs, e.g., as shown in FIG. 1, and the output of each photo-detector pair, e.g., configured as a balanced photo-detector pair, is a corresponding one of electrical signals 138a-138d. This configuration of photo-detectors 136 is a differential configuration that helps to reduce noise and improve DC balancing.

Example optical hybrids that are suitable for use in optical receiver 100 are described, e.g., in commonly owned U.S. Pat. Nos. 7,809,284 and 8,275,224, both of which are incorporated herein by reference in their entirety.

In an example embodiment, DSP 160 performs (i) signal equalization, (ii) clock recovery, and (iii) carrier- and data-recovery (CDR) processing. Signal equalization is generally directed at reducing the detrimental effects of various signal impairments imparted onto optical signal 102 in the optical communication link. Such signal impairments might include, but are not limited to polarization distortion, chromatic dispersion (CD), polarization-mode dispersion (PMD), additive noise, and other linear and nonlinear forms of signal distortion. A person of ordinary skill in the art will appreciate that these signal impairments might accrue in the optical communication link through either localized or distributed mechanisms, or through a combination of both types of mechanisms. Clock recovery is generally directed at synchronizing the digital signal processing performed in DSP 160 with the internal clock of optical signal 102. The CDR processing is generally directed at recovering the transmitted data with a relatively low bit-error rate (BER).

Ideally, digital signals $152_1$-$152_2$ represent the I (in-phase) and Q (quadrature) components, respectively, of the first (e.g., X) polarization component of the original optical communication signal generated at the remote transmitter, and digital signals $152_3$-$152_4$ represent the I and Q components, respectively, of the second (e.g., Y) polarization component of that optical communication signal. However, the often-present misalignment between the principal (X, Y) polarization axes of the remote optical transmitter and the principal (h, v) polarization axes of receiver 100 and polarization rotation in the optical fiber generally cause each of digital signals $152_1$-$152_4$ to be a convoluted signal that has signal distortions and/or contributions from both of the original (X and Y) polarization components. To address this problem, the train of signal processing implemented in DSP 160 includes polarization demultiplexing processing directed at de-convolving digital signals $152_1$-$152_4$ such that the data encoded at the optical transmitter in the X and Y polarizations can be properly recovered for output signal 162.

Figure 2:
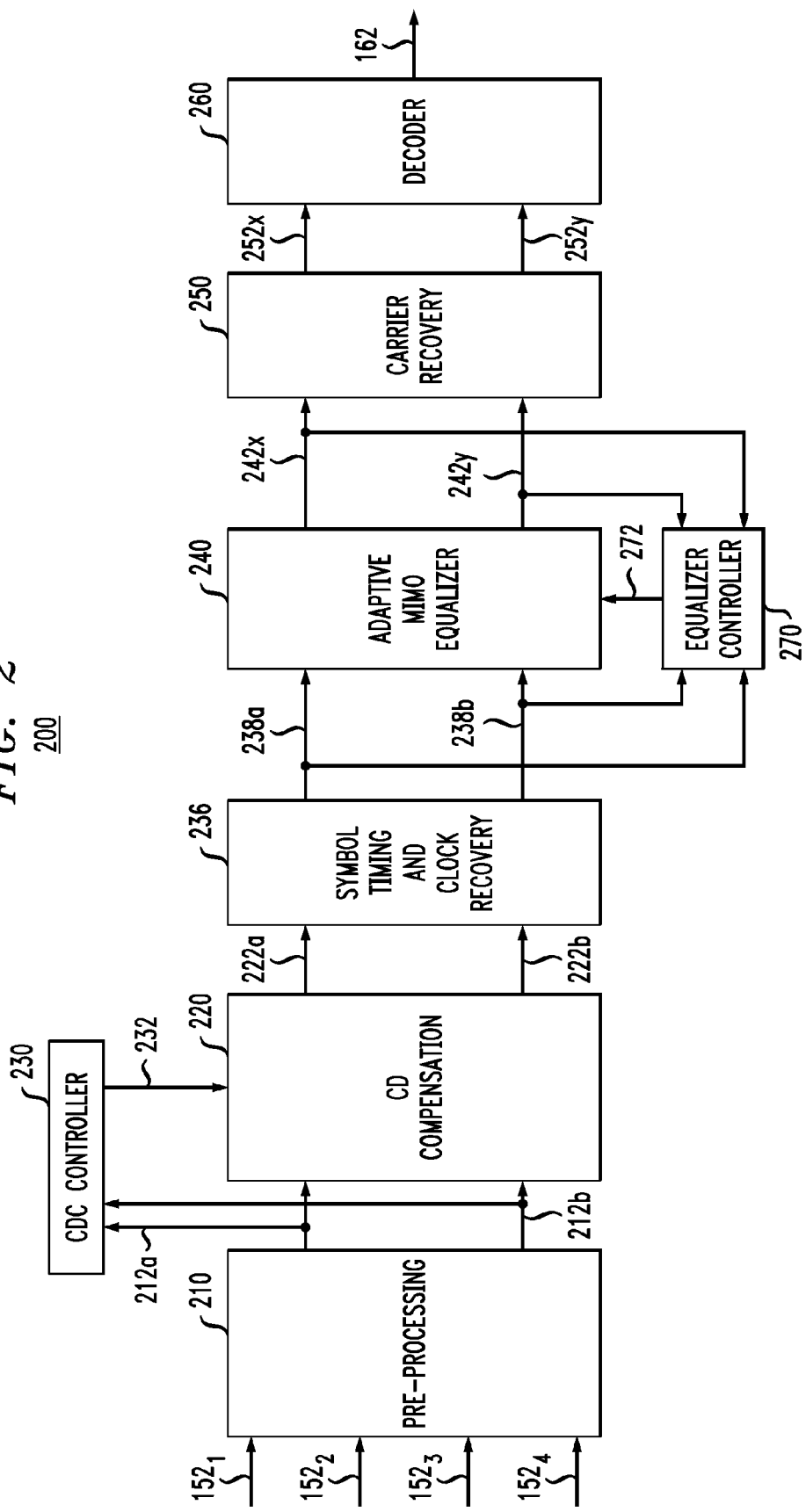
FIG. 2 shows a block diagram of a digital signal processor (DSP) that can be used in the optical receiver of FIG. 1 according to an embodiment.

FIG. 2 shows a block diagram of a DSP 200 that can be used to implement DSP 160 (FIG. 1) according to an embodiment of the disclosure. DSP 200 is illustratively shown in FIG. 2 as being configured to (i) receive digital signals $152_1$-$152_4$ and (ii) generate output data signal 162 (also see FIG. 1). Alternative configurations of DSP 200 are also contemplated.

DSP 200 has a signal-pre-processing module 210 configured to receive digital signals $152_1$-$152_4$. One function of module 210 may be to adapt the signal samples received via digital signals $152_1$-$152_4$ to a form more suitable for the signal-processing algorithms implemented in the downstream modules of DSP 200. For example, module 210 may be configured to convert the real-valued signal samples received via digital signals $152_1$-$152_4$ into the corresponding complex-valued signal samples that are then directed downstream, along the signal-processing pipeline of DSP 200, via digital signals 212a and 212b.

In one embodiment, module 210 may also be configured to reduce signal distortions imposed by the front-end of optical receiver 100 (FIG. 1). These distortions may be caused, e.g., by incorrect biasing of various electro-optical components in O/E converter 120, imperfect signal splitting in power and polarization splitters and optical couplers, frequency dependence and variability of the O/E conversion characteristics of the photo-detectors, deskews among the four ADCs 150 (FIG. 1), etc. Representative signal-processing methods that can be implemented in module 210 for this purpose are disclosed, e.g., in commonly owned U.S. Patent Application Publication No. 2012/0057863, which is incorporated herein by reference in its entirety.

Complex-valued digital signals 212a and 212b are applied to a CD compensation (CDC) module 220 for CDC processing therein, and the resulting CDC-processed signals are complex-valued digital signals 222a and 222b. A CDC controller 230 serves to generate a control signal 232 that appropriately configures various configurable elements within CDC module 220 to significantly reduce or substantially cancel the detrimental effects of chromatic dispersion, e.g., caused by the optical communication link configured to feed optical signal 102 into optical receiver 100. In an example embodiment, CDC controller 230 may generate control signal 232 by estimating, based on digital signals 212a and 212b, the group delay in the optical transport link and then determining a configuration of CDC module 220 that compensates the estimated group delay. Example signal-processing methods that can be adapted for generating control signal 232 in DSP 200 are disclosed, e.g., in U.S. Pat. Nos. 8,260,154, 7,636,525, 7,266,310, all of which are incorporated herein by reference in their entirety.

Digital signals 222a and 222b generated by CDC module 220 are applied to a clock-recovery module 236. The signal processing implemented in clock-recovery module 236 causes digital signals 238a and 238b outputted by the clock-recovery module to be properly sampled for the subsequent processing in the downstream modules of DSP 200.

Digital signals 238a and 238b are applied to a 2×2 adaptive MIMO (multiple-input/multiple-output) equalizer 240 for MIMO-equalization processing therein, and the resulting equalized signals are complex-valued digital signals 242x and 242y. In an example embodiment, equalizer 240 may be configured to perform polarization demultiplexing by mixing complex-valued digital signals 238a and 238b to convert them into complex-valued digital signals 242x and 242y approximately in accordance with Eqs. (1a) and (1b):

$$X = H_{xa} * A + H_{xb} * B \quad (1a)$$

$$Y = H_{ya} * A + H_{yb} * B \quad (1b)$$

where X is a string of complex values in signal 242x; Y is a string of complex values in signal 242y; A is a string of complex values in signal 238a; B is a string of complex values in signal 238b; the "*" symbol denotes the convolution operation; and $H_{xa}$, $H_{xb}$, $H_{ya}$, and $H_{yb}$ are the matrix elements of the inverse channel matrix $H^{-1}$. A person of ordinary skill in the relevant art will understand that matrix elements $H_{xa}$, $H_{xb}$, $H_{ya}$, and $H_{yb}$ can be used to determine and set the transfer functions of one or more equalization filters (not explicitly shown in FIG. 2) used in equalizer 240. In some embodiments, these equalization filters may be finite-impulse-response (FIR) filters arranged in a butterfly configuration, e.g., as disclosed in commonly owned U.S. patent application Ser. No. 14/308,756 (filed on Jun. 19, 2014), which is incorporated herein by reference in its entirety.

An individual FIR filter used in equalizer 240 may be realized using a time-domain implementation or a frequency-domain implementation. As known in the art, a time-domain implementation of an FIR filter is configured to generate a filtered output signal by generating a sum of variously delayed and weighted copies of the input signal. A frequency-domain implementation of an FIR filter is configured to generate a filtered output signal by (i) applying a Fourier transform to the input signal, (ii) variously weighting the resulting frequency components, and (iii) applying an inverse Fourier transform to the weighted frequency components.

An equalizer controller 270 operates to (i) estimate the inverse channel matrix $H^{-1}$; (ii) track the matrix changes over time; and (iii) generate a control signal 272 that adaptively configures equalizer 240 to perform the equalization processing corresponding to Eqs. (1a) and (1b). In an example embodiment, equalizer controller 270 may be configured to use a constant-modulus algorithm (CMA), a multi-modulus algorithm (MMA), or a least mean square (LMS) algorithm to determine and update the FIR-filter tap coefficients in equalizer 240. Example algorithms and circuit structures that can be used in equalizer controller 270 are further described below, e.g., in reference to FIGS. 3-4.

In some embodiments, equalizer 240 may also be configured to perform some signal processing directed at further reducing the adverse effects of certain signal impairments, such as PMD, PDL, inter-symbol interference (ISI), and residual CD.

Digital signals 242x and 242y generated by equalizer 240 are applied to a carrier-recovery module 250. Together with a signal decoder 260, carrier-recovery module 250 carries out the above-mentioned CDR processing, which is generally directed at compensating the frequency mismatch between the carrier frequencies of LO signal 112 and optical signal 102, reducing the effects of phase noise, and recovering the transmitted data. Various signal-processing techniques that can be used to implement the frequency-mismatch compensation are disclosed, e.g., in U.S. Pat. No. 7,747,177 and U.S. Patent Application Publication No. 2008/0152361, both of which are incorporated herein by reference in their entirety. Representative signal-processing techniques that can be used to implement phase-error correction are disclosed, e.g., in U.S. Patent Application Publication No. 2013/0230312, which is incorporated herein by reference in its entirety.

Digital signals 252x and 252y generated by carrier-recovery module 250 are applied to decoder 260. Decoder 260 is configured to use the complex values conveyed by digital signals 252x and 252y to appropriately map each received symbol onto an operative constellation and, based on said mapping, recover the corresponding data. Decoder 260 then operates to appropriately multiplex the data recovered from digital signals 252x and 252y to generate output data signal 162.

In some embodiments, decoder 260 may also perform some digital signal processing that implements error correction based on data redundancies (if any) in optical signal 102. Many FEC methods suitable for this purpose are known in the art. Several suitable methods are disclosed, e.g., in U.S. Pat. Nos. 7,734,191, 7,574,146, 7,424,651, 7,212,741, and 6,683,855, all of which are incorporated herein by reference in their entirety.

For illustration purposes and without undue limitation, an example embodiment of equalizer controller 270 is described below in reference to CMA. Based on the provided description, a person of ordinary skill in the relevant art will understand how to make and use alternative embodiments of equalizer controller 270, e.g., configured to use an MMA.

A conventional dual-polarization CMA may be configured to minimize the cost function J(B) given by Eq. (2):

$$J(B) = E\left[\sum_{l=1}^{2}(|y_l|^2 - R^2)^2\right] \quad (2)$$

where B denotes the above-mentioned inverse channel matrix $H^{-1}$; $E[\bullet]$ denotes the statistical expectation; the index $l \in 1,2$ points to a polarization (e.g., the X polarization, when l=1; and the Y polarization, when l=2); $y_l$ is the equalized signal (e.g., carried by signals analogous to signals 242x, 242y; FIG. 2); and R is a constant that depends on the operative constellation and the transmitted-data statistics. The inverse channel matrix B is iteratively updated in accordance with Eq. (3):

$$B(k+1)=B(k)-\mu x(k)^*y(k)|y(k)-R^2|^2 \quad (3)$$

where k is the time-slot index; $\mu$ is an error-weighting coefficient; $x=(x_1, x_2)$ is the non-equalized signal vector (e.g., carried by signals analogous to signals 238a, 238b, FIG. 2); and $y=(y_1, y_2)$ is the equalized signal vector. In an example embodiment, the value of $\mu$ is selected to be relatively small, e.g., on the order of 0.01, to avoid sudden excursions in the values of B and ensure stability of the algorithm.

Although the signal processing corresponding to Eqs. (2) and (3) is relatively straightforward to implement, it may suffer from singularities that cause both outputs of the equalizer to converge to the same state, thereby causing the receiver to lose the data transmitted on one of the two polarizations. One possible reason for this behavior may be that, during the CMA update, the sets of the tap coefficients used in the FIR filters of the equalizer for the two polarizations are modified independently, without using any additional constraints that may prevent the outputs of the equalizer from converging to the same state. The occurrence of singularities may be particularly prevalent in the presence of PDL. The equalizer usually suffers from singularities of this type during the initial convergence of the CMA and/or during periods of relatively fast or large-amplitude fluctuations in the state of the fiber-optic channel.

One possible approach to reducing the occurrence of singularities is to modify the cost function (e.g., J(B), Eq. (2)) by adding to it a term configured to track the degree of correlation between the two equalized signals. This term may be constructed to cause the cost function to have a relatively high value when the degree of correlation is high, thereby forcing the CMA to update the tap coefficients used in the equalization filters in a manner that causes the outputs of the equalizer to converge to different states. While this approach may help the equalizer to operate in a singularity-free manner, the introduction of the additional term to the cost function may significantly increase the amount of calculations, e.g., to the extent that makes the corresponding modified CMA impractical and the corresponding circuitry too expensive and/or complicated for being used in an optical receiver, such as receiver 100 (FIG. 1).

Embodiments disclosed herein are directed at providing a modified cost function that enables the equalizer and the corresponding control circuitry to track the degree of correlation between the equalized signals without a prohibitive increase in the amount of calculations with respect to a conventional dual-polarization CMA. As such, the modified cost function may lend itself for effective use in the train of signal processing implemented at an optical receiver, such as receiver 100 (FIG. 1).

In an example embodiment, a modified cost function J'(B) is given by Eqs. (4a)-(4c), as follows:

$$J'(B) = J(B) + 2\sum_{\substack{i=1\\j\neq i}}^{2}\sum_{\delta=\delta_1}^{\delta_2}|r_{ij}(\delta)|^2 \quad (4a)$$

where J(B) is given by Eq. (2); $\delta_1$ and $\delta_2$ define the length (duration) and position (time alignment) of the cross-correlation window; and $r_{ij}(\delta)$ is the cross-correlation of the symbol quadrants expressed as:

$$r_{ij}(\delta)=E[Q\{y_i(k)\}\times Q\{y_j^*(k-\delta)\}] \quad (4b)$$

where k is the time-slot index; each of indices i and j ($\in 1,2$) point to a polarization (e.g., the X polarization, when 1; and the Y polarization, when 2); and Q{y} is given by:

$$Q\{y\}=\text{sgn}(Re\{y\})+j\,\text{sgn}(Im\{y\}) \quad (4c)$$

where the sign function, sgn (x), is defined as follows:

$$\text{sgn}(x)=-1, \text{ if } x<0$$

$$\text{sgn}(x)=+1, \text{ if } x\geq 0$$

Note that the function Q{y} has only four possible complex values: 1+j, 1−j, −1+j, and −1−j. As such, Q{y} can be used to unequivocally identify or point to the complex-plane quadrant in which the symbol y is located. For example, when Q{y}=1+j, the symbol y is located in the first quadrant of the complex plane. When Q{y}=−1+j, the symbol y is located in the second quadrant of the complex plane. When Q{y}=−1−j, the symbol y is located in the third quadrant of the complex plane. When Q{y}=1−j, the symbol y is located in the fourth quadrant of the complex plane.

The iterative update of the inverse channel matrix B (previously given by Eq. (3)) is also modified due to the above-described modification of the cost function and may now be performed in accordance with Eq. (5):

$$B_j(k+1) = B_j(k) - \mu\left(x_j(k)^*y_j(k)|y_j(k)-R^2|^2 + y_i(k)x_j(k)^*\sum_{\delta=\delta_1}^{\delta_2}r_{ij}(\delta)\right) \quad (5)$$

where $i\neq j$.

The modified CMA defined by Eqs. (4)-(5) can be described as being configured to use a coarse 1-bit quantization of a fixed-point variable, wherein the considered bit is the sign bit. The coarse 1-bit quantization appears to work well for determining the degree of correlation between the equalized signals $y_1(k)$ and $y_2(k)$ because, if $y_1(k)$ and $y_2(k)$ are uncorrelated complex variables with the zero mean and unit variance (which is typically the case for multiplexed signals, such as signal 102, FIG. 1), then the correlation function $C_Q(\delta)=Q\{y_1(k)\}\times Q\{y_2^*(k-\delta)\}$ (also see Eq. (4b)) constructed using the product of quadrant pointers Q{y} and a conventional correlation function $C_P(\delta)=y_1(k)\times y_2^*(k-\delta)$ constructed using a direct product of the variables y should mathematically be in a linear relationship with one another. As such, the correlation function $C_Q(\delta)$ can be used as a proxy for the correlation function $C_P(\delta)$ without any loss of information that is pertinent to a determination of the degree of correlation of $y_1(k)$ and $y_2(k)$. From the practical viewpoint, however, the use of the correlation function $C_Q(\delta)$ instead of the correlation function $C_P(\delta)$ is beneficial, e.g., because the correlation function $C_Q(\delta)$ can be computed with significantly fewer basic CPU operations, such as additions, subtractions, multiplications, divisions, bit-shifts, etc.

Figure 3:
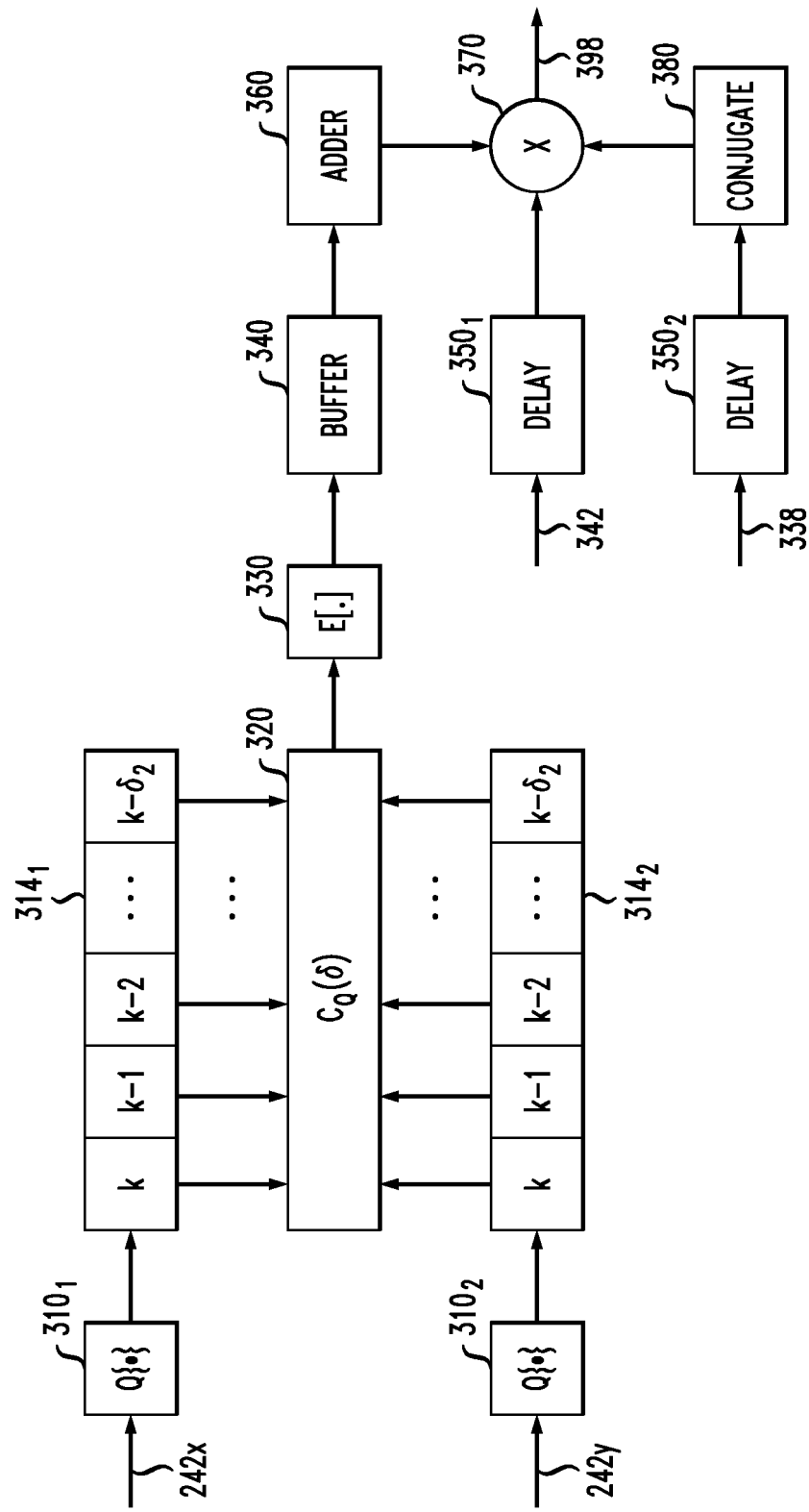
FIG. 3 shows a block diagram of a digital circuit that can be used in the DSP of FIG. 2 according to an embodiment.

FIG. 3 shows a block diagram of a digital circuit 300 that can be used in equalizer controller 270 (FIG. 2) according to an embodiment of the disclosure. More specifically, circuit 300 is configured to perform computations for the iterative update of the inverse channel matrix B corresponding to the part of Eq. (5) that is given by the following expression:

$$y_i(k)x_j(k)^* \sum_{\delta=\delta_1}^{\delta_2} r_{ij}(\delta) \quad (6)$$

As explained in reference to Eq. (5), the pair (i,j) may be the pair (1,2) or the pair (2,1).

Circuit 300 is (i) connected to receive, as inputs, digital signals 242x and 242y, and one of digital signals 238a and 238b (e.g., as further explained below; also see FIG. 2) and (ii) configured to generate, as an output, a digital signal 398 configured to carry complex values computed in accordance with Eq. (6). Digital signals 242x and 242y are applied to quadrant-identifier modules $310_1$ and $310_2$, respectively. A digital signal 342 applied to a delay element $350_1$ is a copy of either digital signal 242x or digital signal 242y. A digital signal 338 applied to a delay element $350_2$ is a copy of either digital signal 238a or digital signal 238b. More specifically, when digital signal 342 is a copy of digital signal 242x, digital signal 338 is a copy of digital signal 238b. When digital signal 342 is a copy of digital signal 242y, digital signal 338 is a copy of digital signal 238a.

Each of quadrant-identifier modules $310_1$ and $310_2$ is configured to evaluate the quadrant-identifier function Q{y} (see Eq. (4c)) to each complex value received via the respective one of digital signals digital signals 242x and 242y. These evaluations convert each complex value $y_1(k)$ and $y_2(k)$ received in symbol time slot (k) into the corresponding one of four quadrant-identifier values 1+j, 1−j, −1+j, and −1−j. In each symbol time slot (k), the quadrant identifier value generated by the respective one of modules $310_1$ and $310_2$ is applied to a corresponding one of shift registers $314_1$ and $314_2$. Shift registers $314_1$ and $314_2$ are illustratively shown in FIG. 3 as having a length of ($\delta_2$+1), which corresponds to a configuration in which $\delta_1$=0. In various alternative embodiments, shift registers $314_1$ and $314_2$ may have other suitable lengths to accommodate other values of $\delta_1$ and/or $\delta_2$, which define the length and position of the cross-correlation window as explained above in reference to Eq. (4a).

At each test time, a correlation module 320 is configured to evaluate a discrete-valued correlation $C_Q(\delta)$ by (i) reading out the complex values stored in shift registers $314_1$ and $314_2$ and (ii) appropriately cross-multiplying them to generate a plurality of complex values. To evaluate $C_Q(\delta)$, correlation module 320 typically evaluates the following product:

$$C_Q(\delta) = Q\{y_1(k)\} \times Q\{y_2^*(k-\delta)\} \quad (7)$$

which involves values of the quadrant identifiers in the time interval [k, k−δ]. Here, $Q\{y_1(k)\}$ denotes the quadrant-identifier values stored in shift register $314_1$ at the test time, and $Q\{y_2^*(k-\delta)\}$ denotes the complex conjugates of the quadrant-identifier values stored in shift register $314_2$ at an earlier test time, or vice versa. Correlation module 320 is further configured to apply the generated plurality of complex values of the discrete-valued correlation function $C_Q(\delta)$ to a statistical-expectation generator 330 that (i) converts the values into the discrete-valued cross-correlation $r_{ij}(\delta)$ of the symbol quadrants in accordance with Eq. (4b) and (ii) stores the resulting $r_{ij}(\delta)$ values in a buffer 340.

An adder 360 operates to read the complex values stored in buffer 340 and then generate their sum in accordance with the following expression:

$$\sum_{\delta=\delta_1}^{\delta_2} r_{ij}(\delta).$$

Delay elements $350_2$ and $350_2$ operate to appropriately delay digital signals 342 and 338 for the amount of time that accounts for the delays associated with the signal processing in modules 310, 320, 330, 360, and 380. A multiplier 370 evaluates the product of Eq. (6) by multiplying the values received from modules $350_1$, 360, and 380 and outputs the product via output signal 398.

In an example embodiment, equalizer controller 270 (FIG. 2) may be implemented as a part of an ASIC that is configured, inter alia, to perform cost-function and channel-matrix calculations in accordance with Eqs. (4a) and (5). Inspection of these equations reveals that both sets of calculations involve the calculation of $$\sum_{\delta=\delta_1}^{\delta_2} r_{ij}(\delta).$$

Circuit 300 is configured to perform this calculation, as described above, using the portion of the circuit that comprises modules 310, 314, 320, 330, 340, and 360. In some embodiments, two copies of this portion of circuit 300 may be used in equalizer controller 270 to perform the requisite cost-function and channel-matrix calculations in accordance with Eqs. (4a) and (5), respectively. In some embodiments, equalizer controller 270 may have two processing branches corresponding to the X and Y polarizations, respectively, with each of these processing branches having a respective copy of circuit 300.

A person of ordinary skill in the art will understand how to make and use digital circuits (e.g., ASICs) configured to perform calculations of the cost function J(B) defined by Eq. (2). Conventional digital circuits that may be adapted for this purpose are disclosed, e.g., in U.S. Pat. Nos. 7,061,977 and 6,904,087, both of which are incorporated herein by reference in their entirety. A person of ordinary skill in the art will further understand how to combine these conventional digital circuits with circuit 300 or a relevant portion thereof to carry out the calculations corresponding to Eqs. (4)-(5).

FIG. 4 shows a flowchart of a signal-processing method 400 according to an embodiment of the disclosure. Method 400 provides an extension of the modified CMA described above in reference to FIGS. 2 and 3 and Eqs. (4)-(5). More specifically, method 400 may be used to configure an N×N MIMO equalizer for demultiplexing processing, where N is an integer greater than one. Possible applications of method 400 are not limited to optical communications and may also occur in the field of wireless communications and other fields that use MIMO equalization and/or signal multiplexing and demultiplexing.

In the context of optical communications, method 400 may be used, e.g., for demultiplexing a spatially multiplexed optical signal transmitted over a multimode or multi-core optical fiber, wherein inter-mode crosstalk or intra-link mode mixing can cause each spatial mode at the receiver end of the fiber to carry a respective combination of the modulated optical signals initially coupled into different spatial modes at the transmitter end of the fiber. Examples of optical communication systems configured to use spatially multiplexed optical signals are disclosed, e.g., in commonly owned U.S. Patent Application Publication Nos. 2013/0070785, 2012/0224863, 2012/0224861, and 2010/0329671, all of which are incorporated herein by reference in their entirety. Examples of adaptive MIMO equalizers that may benefit from the use of method 400 are disclosed, e.g., in commonly owned U.S. Patent Application Publication No. 2014/0186024, which is incorporated herein by reference in its entirety.

At step 402 of method 400, a receiver receives a multiplexed communication signal carrying N independently modulated signal components, each configured to transport a different respective data stream. The data streams may be encoded using different respective subsets of the physical characteristics of the corresponding carrier wave(s), e.g., selected from polarization, frequency, spatial mode, etc. The modulation used in the generation of the independently modulated signal components at the transmitter may include phase modulation and/or amplitude modulation. As indicated above, the received multiplexed communication signal may be (i) an optical signal, (ii) an electromagnetic wave transmitted through free space, (iii) an electromagnetic wave transmitted through a conduit (e.g., a waveguide), (iv) an electrical signal, etc.

At step 404, the receiver converts the multiplexed communication signal received at step 402 into a first plurality of electrical digital signals having at least N signals, wherein each signal has contributions from two or more of the original N independently modulated signal components. A person of ordinary skill in the art will understand that, for proper recovery of all N data streams, the first plurality of electrical digital signals needs to have N signals that are linearly independent of one another. In practice, the receiver may be configured to perform the signal conversion in a manner that causes each of these N signals to represent a different respective linear combination of the original N independently modulated signal components.

At step 406, an adaptive MIMO equalizer in the receiver, e.g., functionally analogous to equalizer 240 (FIG. 2), applies a transformation to the first plurality of electrical digital signals to generate a second plurality of electrical digital signals, wherein each electrical digital signal represents only a respective single one of the original N independently modulated signal components and, as such, carries the data from only the respective one data stream of the original N different data streams. An equalizer controller, e.g., functionally analogous to equalizer controller 270 (FIG. 2), properly configures the equalizer to perform the transformation in a manner that causes different electrical digital signals of the second plurality to represent different respective independently modulated signal components. In other words, the equalizer controller causes the equalizer to employ the sets of FIR-filter coefficients that prevent any two or more equalizer outputs from converging to the same state, thereby enabling a substantially singularity-free operation of the equalizer.

At step 408, the equalizer controller uses the first plurality of electrical digital signals and the second plurality of electrical digital signals to update the sets of FIR-filter coefficients used in the transformation of step 406. In an example embodiment, the update of step 408 can be performed using an inverse channel matrix that is analogous to the inverse channel matrix B, e.g., as explained above in reference to Eq. (5). The update process may include a computation of a cost function that is analogous to the cost function J'(B), e.g., as indicated above in reference to Eqs. (4a)-(4c).

The cost function may include one or more cross-correlation terms, each configured to quantify the degree of correlation for a different respective pair of electrical digital signals of the second plurality. In general, for an N×N MIMO equalizer, the cost function may have as many as C(N, 2) distinct cross-correlation terms, where C(N, 2) is the binomial coefficient given by Eq. (8):

$$C(N, 2) = \frac{N!}{2!(N-2)!} \tag{8}$$

For example, in an embodiment of method 400 corresponding to N=2, there is a single cross-correlation term because C(2, 2)=1. This single cross-correlation term may be analogous to the cross-correlation term shown in Eq. (4a).

As another example, when N=3, the cost function may have three distinct cross-correlation terms because C(3, 2)=3. Each of these cross-correlation terms may be analogous to the cross-correlation term shown in Eq. (4a), but configured to quantify the degree of correlation of a different respective pair of electrical digital signals of the second plurality.

As yet another example, when N=4, the cost function may have six distinct cross-correlation terms because C(4, 2)=6.

As explained above in reference to Eqs. (4b)-(4c), the degree of correlation of a pair of electrical digital signals may be determined in a computationally efficient manner by making a direct comparison, over the length of the correlation window, of the quadrants in which the complex values (or symbols) represented by the electrical digital signals of the pair are located. In an example embodiment, this direct comparison may be performed by multiplying, in each time slot, the quadrant-identifier values $Q\{y\}$ (see Eq. (4c)) generated by applying coarse 1-bit quantization to the signed complex values carried by the electrical digital signals, wherein the considered bit is the sign bit for the real part and for the imaginary part. The length (duration) and position (time alignment) of the cross-correlation window are algorithm parameters that are selected to allow for a statistically sufficient sampling of the data streams carried by the electrical digital signals of the pair.

According to an example embodiment disclosed above in reference to FIGS. 1-4, provided is an apparatus (e.g., 100, FIG. 1) comprising: an optical detector that includes a polarization splitter (e.g., 122a, FIG. 1) configured to split an optical polarization-division-multiplexed signal (e.g., 102, FIG. 1) into two light beams and an optical-to-electrical converter (e.g., 120+140+150, FIG. 1) configured to generate a plurality of electrical signals (e.g., $152_1$-$152_4$, FIG. 1) by optically detecting different combinations of light of the two light beams with light of an optical local oscillator (e.g., 112, FIG. 1); and a digital signal processor (e.g., 160, FIG. 1) configured to receive the plurality of electrical signals from the optical detector and generate therefrom an estimate of first data carried by a first polarization of the optical PDM signal and second data carried by a different second polarization of the optical PDM signal. The digital signal processor comprises: an adaptive equalizer (e.g., 240, FIG. 2) configured to apply polarization demultiplexing (e.g., described by Eq. (1)) to a first pair of complex-valued electrical digital signals generated by the digital signal processor from the plurality of electrical digital signals to generate a second pair of complex-valued electrical digital signals (e.g., 242, FIG. 2), wherein a first complex-valued electrical digital signal of the second pair is encoded with the first data but not the second data, and a second complex-valued electrical digital signal of the second pair is encoded with the second data but not the first data; and an equalizer controller (e.g., 270, FIG. 2) operatively connected (e.g., via 272, FIG. 2) to adaptively configure the adaptive equalizer based on a degree of correlation of the first complex-valued electrical digital signal and the second complex-valued electrical digital signal determined by identifying and comparing quadrants in which complex values carried by the first and second complex-valued electrical digital signals are located over a plurality of time slots.

In some embodiments of the above apparatus, the equalizer controller comprises a first circuit module (e.g., $310_1$, FIG. 3) configured to apply 1-bit quantization to the complex values carried by the first complex-valued electrical digital signal, wherein a considered single bit is a sign bit.

In some embodiments of any of the above apparatus, the first circuit module is configured to: apply 1-bit quantization to a real part of a complex value to obtain a sign bit of the real part; apply 1-bit quantization to an imaginary part of the complex value to obtain the sign bit of the imaginary part; and generate a quadrant-identifier value (e.g., Q{y}, Eq. (4c)) using the sign bit of the real part and the sign bit of the imaginary part.

In some embodiments of any of the above apparatus, the equalizer controller further comprises a second circuit module (e.g., $310_2$, FIG. 3) configured to apply 1-bit quantization to the complex values carried by the second complex-valued electrical digital signal, wherein a considered single bit is a sign bit.

In some embodiments of any of the above apparatus, the equalizer controller is configured to: generate (e.g., using $310_1$, FIG. 3) a first quadrant-identifier value for the first complex-valued electrical digital signal in a first time slot; generate (e.g., using $310_2$, FIG. 3) a second quadrant-identifier value for the second complex-valued electrical digital signal in a second time slot different from the first time slot; generate (e.g., using 320, FIG. 3) a product of the first quadrant-identifier value and the second quadrant-identifier value (e.g., as in Eq. (7)); and determine (e.g., using 330+340+360, FIG. 3) the degree of correlation using said product.

In some embodiments of any of the above apparatus, the equalizer controller is further configured to generate (e.g., using 320, FIG. 3) a plurality of the products for a plurality of second time slots different from the first time slot and each other.

In some embodiments of any of the above apparatus, the equalizer controller is configured to iteratively update an estimate of an inverse channel matrix (e.g., B) based on the degree of correlation (e.g., in accordance with Eq. (5)).

In some embodiments of any of the above apparatus, the equalizer controller is operatively connected to adaptively configure the adaptive equalizer based on the estimate of the inverse channel matrix.

According to another example embodiment disclosed above in reference to FIGS. 1-4, provided is a machine-implemented signal-processing method (e.g., 400, FIG. 4) comprising the steps of: receiving (e.g., 402, FIG. 4) a multiplexed communication signal (e.g., similar to 102, FIG. 1) carrying N modulated signal components, each configured to carry a different respective data stream, where N is an integer greater than two; converting (e.g., 404, FIG. 4) the multiplexed communication signal into a first plurality of electrical digital signals (e.g., similar to 238, FIG. 2), wherein each electrical digital signal of the first plurality has contributions from two or more of the N modulated signal components; applying (e.g., 406, FIG. 4) a transformation (e.g., similar to that of Eq. (1)) to the first plurality of electrical digital signals to generate a second plurality of electrical digital signals (e.g., similar to 242, FIG. 2), wherein each electrical digital signal of the second plurality represents a respective single modulated signal component of the N modulated signal components; and configuring (e.g., 408, FIG. 4) the transformation, based on degrees of correlation of pairs of the electrical digital signals in the second plurality, in a manner that causes different signals of the second plurality to represent different respective modulated signal components of the N modulated signal components.

In some embodiments of the above method, the configuring comprises determining a degree of correlation of a first electrical digital signal of the second plurality and a second electrical digital signal of the second plurality by identifying and comparing quadrants in which complex values carried by the first and second electrical digital signals are located over a plurality of time slots.

In some embodiments of any of the above methods, the configuring further comprises determining a degree of correlation of the first electrical digital signal of the second plurality and a third electrical digital signal of the second plurality by identifying and comparing quadrants in which complex values carried by the first and third electrical digital signals are located over the plurality of time slots.

In some embodiments of any of the above methods, the configuring comprises applying 1-bit quantization to complex values carried by the electrical digital signals of the second plurality, wherein a considered bit is a sign bit.

In some embodiments of any of the above methods, the applying comprises: applying 1-bit quantization to a real part of a complex value to obtain a sign bit of the real part; and applying 1-bit quantization to an imaginary part of the complex value to obtain the sign bit of the imaginary part.

In some embodiments of any of the above methods, the identifying comprises generating a quadrant-identifier value (e.g., Q{y}, Eq. (4c)) using the sign bit of the real part and the sign bit of the imaginary part.

In some embodiments of any of the above methods, the configuring comprises determining a degree of correlation of a first electrical digital signal of the second plurality and a second electrical digital signal of the second plurality by: generating a first quadrant-identifier value for the first electrical digital signal in a first time slot; generating a second quadrant-identifier value for the second electrical digital signal in a second time slot different from the first time slot; and generating a product of the first quadrant-identifier value and the second quadrant-identifier value (e.g., as in Eq. (7)).

In some embodiments of any of the above methods, the transformation is performed based on $$\frac{N!}{2!(N-1)!}$$

different degrees of correlation of the pairs of the electrical digital signals in the second plurality.

In some embodiments of any of the above methods, the applying is performed using an adaptive N×N MIMO equalizer (e.g., analogous to 240, FIG. 2).

In some embodiments of any of the above methods, the configuring is performed using an equalizer controller (e.g., analogous to 270, FIG. 2).

In some embodiments of any of the above methods, the configuring comprises executing a constant-modulus algorithm (CMA) to update filter tap coefficients in the adaptive N×N MIMO equalizer.

In some embodiments of any of the above methods, the configuring comprises executing a multi-modulus algorithm (MMA) to update filter tap coefficients in the adaptive N×N MIMO equalizer.

In some embodiments of any of the above methods, the receiving comprises receiving the multiplexed communication signal through a multimode or multi-core optical fiber, wherein each of the N modulated signal components corresponds to a different respective spatial mode of the multimode or multi-core optical fiber.

In some embodiments of any of the above methods, the multiplexed communication signal is an electromagnetic wave wirelessly received through free space.

According to yet another example embodiment disclosed above in reference to FIGS. 1-4, provided is a machine-implemented signal-processing method (e.g., 400, FIG. 4) comprising the steps of: receiving (e.g., 402, FIG. 4) a polarization-division-multiplexed optical signal (e.g., 102, FIG. 1) having a first modulated polarization component and a second modulated polarization component, each configured to carry a different respective data stream; converting (e.g., 404, FIG. 4) the polarization-division-multiplexed optical signal into a first pair of electrical digital signals (e.g., 238, FIG. 2), wherein each electrical digital signal of the first pair has contributions from both of the first and second modulated polarization components; applying (e.g., 406, FIG. 4) a transformation (e.g., described by Eq. (1)) to the first pair of electrical digital signals to generate a second pair of electrical digital signals (e.g., 242, FIG. 2), wherein each electrical digital signal of the second pair represents a different single one of the first and second modulated polarization components; and configuring (e.g., 408, FIG. 4) the transformation based on a degree of correlation of the second pair of the electrical digital signals determined by identifying and comparing quadrants in which complex values carried by the electrical digital signals of the second pair are located over a plurality of time slots.

According to yet another example embodiment disclosed above in reference to FIGS. 1-4, provided is an apparatus comprising a digital signal processor (e.g., 160, FIG. 1) that comprises an equalizer (e.g., 240, FIG. 2) configured to equalize first complex electrical digital signals (e.g., 238*a*, FIG. 2) of a first sequence and to equalize different second complex electrical digital signals (e.g., 238*b*, FIG. 2) of a second sequence. The digital signal processor is configured to make quadrant measurements (e.g., in accordance with Eq. (4c)) of individual ones of the complex digital signals of the first sequence and to make quadrant measurements (e.g., in accordance with Eq. (4c)) of individual ones of the complex digital signals of the second sequence. The digital signal processor is further configured to evaluate (e.g., in accordance with Eq. (4b)) a correlation between the quadrant measurements of the individual ones of the complex digital signals of the first sequence with the quadrant measurements of the individual ones of the complex digital signals of the second sequence.

In some embodiments of the above apparatus, the digital signal processor is configured to adaptively configure the equalizer based on the quadrant measurements of the individual ones of the complex digital signals of both sequences.

In some embodiments of any of the above apparatus, the digital signal processor is configured to make the quadrant measurements on the individual ones of the complex digital signals of the sequences in which the complex digital signals have more than four different values (e.g., due to the use of a constellation that has more than four constellation points).

In some embodiments of any of the above apparatus, the apparatus further comprises a coherent optical receiver (e.g., 100, FIG. 1) being configured to decode different data transmitted using two polarizations of an optical signal. The coherent optical receiver includes an optical engine (e.g., 120+140+150, FIG. 1) configured to transmit first digital electrical measurements of a first polarization of the optical signal and second digital electrical measurements of a different second polarization of the optical signal to the digital signal processor.

This disclosure describes illustrative embodiments, which are not intended to limit the scope of the claimed inventions.

For example, other embodiments of the DSP 160 (FIG. 1) may be configured to perform the computations corresponding to Eqs. (4)-(6) in the frequency domain based on the following equation:

$$\sum_{\delta=\delta_1}^{\delta_2} r_{ij}(\delta) = \sum_{\delta=\delta_1}^{\delta_2} E[Q\{y_i(k)\} \times Q\{y_j^*(k-\delta)\}] \equiv \quad (9)$$
$$s \times IFFT\{FFT\{Q\{y_i(k-\delta_1:k-\delta_2)\} * FFT\{Q\{y_j(k-\delta_1:k-\delta_2)\}\}$$

Here, s is a scaling factor; IFFT denotes an inverse fast Fourier transform; and FFT denotes a fast Fourier transform.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
a digital signal processor that comprises an equalizer configured to equalize first complex electrical digital signals of a first sequence and to equalize different second complex electrical digital signals of a second sequence; and
wherein the digital signal processor is configured to make quadrant measurements of individual ones of the complex digital signals of the first sequence and to make quadrant measurements of individual ones of the complex digital signals of the second sequence; and
wherein the digital signal processor is further configured to evaluate a correlation between the quadrant measurements of the individual ones of the complex digital signals of the first sequence with the quadrant measurements of the individual ones of the complex digital signals of the second sequence.

2. The apparatus of claim 1, wherein the digital signal processor is configured to adaptively configure the equalizer based on the quadrant measurements of the individual ones of the complex digital signals of the first and second sequences.

3. The apparatus of claim 1, wherein the digital signal processor is configured to make the quadrant measurements on the individual ones of the complex digital signals of the sequences in which the complex digital signals have more than four different values.

4. The apparatus of claim 1, further comprising a coherent optical receiver being configured to decode different data transmitted using two polarizations of an optical signal; and
wherein the coherent optical receiver includes an optical engine configured to transmit first digital electrical measurements of a first polarization of the optical signal and second digital electrical measurements of a different second polarization of the optical signal to the digital signal processor.

5. The apparatus of claim 4, wherein the digital signal processor is configured to adaptively configure the equalizer based on the quadrant measurements of the individual ones of the complex digital signals of the first and second sequences.

6. An apparatus comprising:
an optical detector that includes a polarization splitter configured to split an optical polarization-division-multiplexed (PDM) signal into two light beams and an optical-to-electrical converter configured to generate a plurality of electrical signals by optically detecting different combinations of light of the two light beams with light of an optical local oscillator; and
a digital signal processor configured to receive the plurality of electrical signals from the optical detector and generate therefrom an estimate of first data carried by a first polarization of the optical PDM signal and second data carried by a different second polarization of the optical PDM signal, wherein the digital signal processor comprises:
an equalizer configured to apply polarization demultiplexing to a first pair of complex-valued electrical digital signals generated by the digital signal processor from the plurality of electrical digital signals to generate a second pair of complex-valued electrical digital signals, wherein a first complex-valued electrical digital signal of the second pair is encoded with the first data but not the second data, and a second complex-valued electrical digital signal of the second pair is encoded with the second data but not the first data; and an equalizer controller operatively connected to adaptively configure the equalizer based on a degree of correlation of the first complex-valued electrical digital signal and the second complex-valued electrical digital signal determined by identifying and comparing quadrants in which complex values carried by the first and second complex-valued electrical digital signals are located over a plurality of time slots.

7. The apparatus of claim 6, wherein the equalizer controller comprises a first circuit module configured to apply 1-bit quantization to the complex values carried by the first complex-valued electrical digital signal, wherein a considered single bit is a sign bit.

8. The apparatus of claim 7, wherein the first circuit module is configured to:
apply 1-bit quantization to a real part of a complex value to obtain a sign bit of the real part;
apply 1-bit quantization to an imaginary part of the complex value to obtain the sign bit of the imaginary part; and
generate a quadrant-identifier value using the sign bit of the real part and the sign bit of the imaginary part.

9. The apparatus of claim 7, wherein the equalizer controller further comprises a second circuit module configured to apply 1-bit quantization to the complex values carried by the second complex-valued electrical digital signal, wherein a considered single bit is a sign bit.

10. The apparatus of claim 6, wherein the equalizer controller is configured to:
generate a first quadrant-identifier value for the first complex-valued electrical digital signal in a first time slot;
generate a second quadrant-identifier value for the second complex-valued electrical digital signal in a second time slot different from the first time slot;
generate a product of the first quadrant-identifier value and the second quadrant-identifier value; and
determine the degree of correlation using said product.

11. The apparatus of claim 10, wherein the equalizer controller is further configured to generate a plurality of the products for a plurality of second time slots different from the first time slot and each other.

12. The apparatus of claim 6,
wherein the equalizer controller is configured to iteratively update an estimate of an inverse channel matrix based on the degree of correlation; and
the equalizer controller is operatively connected to adaptively configure the equalizer based on the estimate of the inverse channel matrix.

13. A machine-implemented signal-processing method comprising:
receiving a multiplexed communication signal carrying N modulated signal components, each configured to carry a different respective data stream, where N is an integer greater than two;
converting the multiplexed communication signal into a first plurality of electrical digital signals, wherein each electrical digital signal of the first plurality has contributions from two or more of the N modulated signal components;
applying a transformation to the first plurality of electrical digital signals to generate a second plurality of electrical digital signals, wherein each electrical digital signal of the second plurality represents a respective single modulated signal component of the N modulated signal components; and
configuring the transformation, based on degrees of correlation of pairs of the electrical digital signals in the second plurality, in a manner that causes different signals of the second plurality to represent different respective modulated signal components of the N modulated signal components.

14. The machine-implemented signal-processing method of claim 13, wherein the configuring comprises determining a degree of correlation of a first electrical digital signal of the second plurality and a second electrical digital signal of the second plurality by identifying and comparing quadrants in which complex values carried by the first and second electrical digital signals are located over a plurality of time slots.

15. The machine-implemented signal-processing method of claim 14, wherein the configuring further comprises determining a degree of correlation of the first electrical digital signal of the second plurality and a third electrical digital signal of the second plurality by identifying and comparing quadrants in which complex values carried by the first and third electrical digital signals are located over the plurality of time slots.

16. The machine-implemented signal-processing method of claim 13, wherein the configuring comprises applying 1-bit quantization to complex values carried by the electrical digital signals of the second plurality, wherein a considered bit is a sign bit.

17. The machine-implemented signal-processing method of claim 16,
wherein the applying comprises:
applying 1-bit quantization to a real part of a complex value to obtain a sign bit of the real part; and
applying 1-bit quantization to an imaginary part of the complex value to obtain the sign bit of the imaginary part; and
wherein the identifying comprises generating a quadrant-identifier value using the sign bit of the real part and the sign bit of the imaginary part.

18. The machine-implemented signal-processing method of claim 13, wherein the configuring comprises determining a degree of correlation of a first electrical digital signal of the second plurality and a second electrical digital signal of the second plurality by:
generating a first quadrant-identifier value for the first electrical digital signal in a first time slot;
generating a second quadrant-identifier value for the second electrical digital signal in a second time slot different from the first time slot; and
generating a product of the first quadrant-identifier value and the second quadrant-identifier value.

19. The machine-implemented signal-processing method of claim 13, wherein the transformation is performed based on $$\frac{N!}{2!(N-2)!}$$

different degrees of correlation of the pairs of the electrical digital signals in the second plurality.

20. The machine-implemented signal-processing method of claim 13,
wherein the applying is performed using an N×N MIMO (multiple input, multiple output) equalizer;

wherein the configuring is performed using an equalizer controller; and wherein the configuring comprises executing a constant-modulus algorithm (CMA) or a multi-modulus algorithm (MMA) to update filter tap coefficients in the N×N MIMO equalizer.

* * * * *